Patented Aug. 23, 1927.

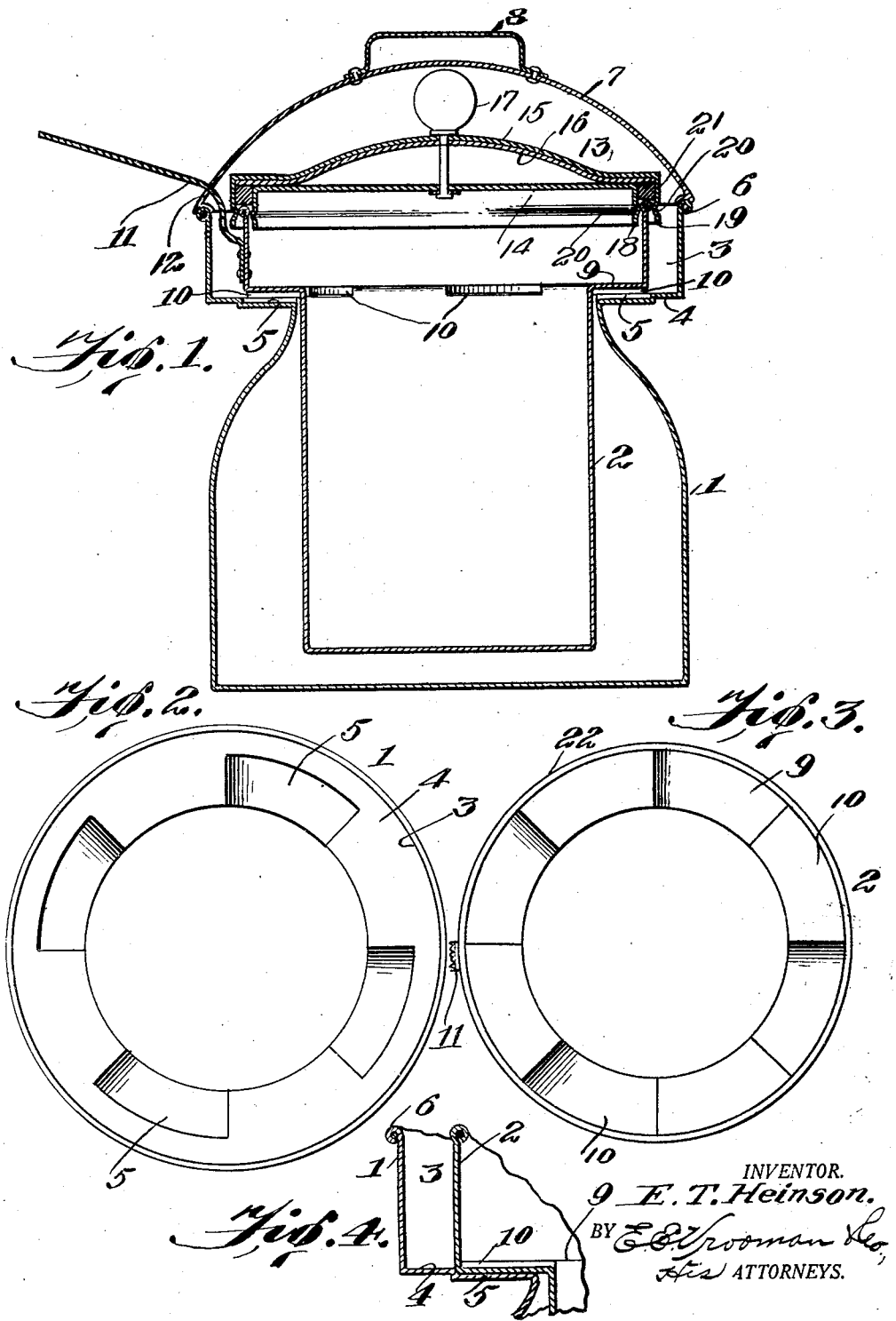

1,640,190

UNITED STATES PATENT OFFICE.

ERNEST T. HEINSON, OF MOUNTAIN IRON, MINNESOTA, ASSIGNOR OF TEN PER CENT TO THOMAS H. STRIZICH, OF THE VILLAGE OF HIBBING, MINNESOTA.

WATERLESS COOKER.

Application filed September 7, 1926. Serial No. 133,864.

This invention relates to a waterless cooker.

The object of the invention is the construction of a simple and efficient cooker, which includes an outer receptacle provided with an offset portion and said offset portion being provided with means for permitting the inner receptacle to be held or retained in a tight, closed position upon the outer receptacle or in a slightly spaced or raised position, as the operator desires.

Another object of the invention is the construction of a cooker with an efficient, "airtight" weighted lid or cover.

A still further object of the invention is the construction of an outer receptacle with an "overflow" offset portion that is provided with means in its bottom that co-operates with means formed on the inner receptacle for holding the inner and outer receptacle slightly spaced or separated to allow steam or water to pass therebetween.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a vertical, central sectional view of a cooker constructed in accordance with the present invention.

Figure 2 is a top plan view of the outer receptacle.

Figure 3 is a top plan view of the inner receptacle.

Figure 4 is a fragmentary, sectional view of the outer and inner receptacles in their normal seated or closed position.

Referring to the drawings by numerals, 1 comprises the outer or water containing receptacle and 2 is the inner or food containing receptacle. The outer receptacle 1 is provided with an offset portion 3 at its upper end, and in the bottom 4 of said offset portion are formed a plurality of straight, horizontal elongated sockets 5. The upper end 6 of receptacle 1 is preferably rolled, and resting upon the rolled upper end is the lid or cover 7, provided with grip 8.

The inner receptacle 2 is provided with a shoulder 9, and on this shoulder 9 are formed a plurality of horizontal depending ribs 10, which register with and are adapted to fit into the sockets 5, as shown in Figure 4. In Figure 1, the depending ribs 10 are resting upon the upper face of the bottom 4, and are not in the sockets 5; hence there is formed a space between the inner and outer receptacle, which allows excess steam to pass out, or if the contents of receptacle 1 boils over on to said offset portion 3, such contents can easily run back into the receptacle 1.

A suitable handle 11 is fastened at its inner end to the inner receptacle 2. This handle 11 extends through a notch 12 in the cover 7.

For the inner receptacle 2, I provide an efficient cover 13. This cover 13 comprises inner section 14 and outer outwardly bowed section 15. Between the said sections 14 and 15 is a weighted section 16. This weighted section 16 is upwardly bowed, similar to the outer section 15. A suitable handle 17 extends through sections 14, 15 and 16 and connects or fastens the same together. Section 14 is provided with a depending edge flange 18 and section 15 is provided with a depending edge flange 19. These flanges 18 and 19 are provided with registering inwardly extending beads 20, which retain the annular rubber or fabric ring 21 in place, so that when the cover 13 is in its closed position upon the receptacle 2, the upper rolled edge 22 will be seated between beads 20 and against the filler ring 21, making a tight joint for preventing odors from escaping from the inner or food containing receptacle 2. To create and hold sufficient heat in the food container or vessel 2, to thoroughly cook food in a very short time, I construct the lid or cover 13 as just stated. The cover is sufficiently weighted so that no heat or steam can escape from the food container or vessel 2 until a danger point is reached, and if the cover 13 has been raised by the force of the steam, it will automatically close again; the double flanged structure of lid 13 and packing 21 causes the lid to form a close fit, thereby preventing escape of heat under normal cooking conditions.

When the receptacles are in their closed position as shown in Figure 4, with the ribs 10 in the sockets 5, a very tight closure is obtained, preventing any steam or water, under normal conditions to pass into the offset portion 3. However, if the operator wants steam to escape from the receptacle 1, he can accomplish this by slightly raising and turning the inner receptacle 2 until the ribs 10 engage and rest upon the flat upper face of the floor 4 of the offset portion 3. It is to be noted that the two receptacles have a trough therebetween formed by said shouldered portion and offset portion, Figs. 1 and 4.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a cooker, the combination of an outer receptacle, provided with an offset portion having a floor, said floor provided with elongated sockets open at their inner ends and closed by said floor at their outer ends, said outer ends of the sockets being near to the vertical portion of said offset portion, an inner receptacle provided with a shouldered portion registering with said offset portion of the outer receptacle, said shouldered portion provided on its bottom with elongated depending ribs adapted to be seated in said sockets and form a tight joint when said shouldered portion rests snug on the floor of said offset portion, said ribs extending the whole width of the bottom of said shouldered portion, and said offset portion and said shouldered portion forming a trough between said receptacles.

2. In a cooker, the combination of an outer receptacle provided with an offset portion, said offset portion provided with a horizontal floor having horizontal elongated sockets, an inner receptacle provided with a shouldered portion, said shouldered portion provided with horizontal depending ribs adapted to be seated in said sockets and form a tight joint when said shouldered portion rests snug on the floor of said offset portion, and said offset portion and said shouldered portion producing a trough between said receptacles.

In testimony whereof I hereunto affix my signature.

ERNEST T. HEINSON.